US012442236B2

(12) United States Patent
Pellegrini

(10) Patent No.: US 12,442,236 B2
(45) Date of Patent: Oct. 14, 2025

(54) PIVOT SLIDING DOOR GUIDING DEVICE WITHOUT GUIDE RAIL

(71) Applicant: Bode—Die Tür GmbH, Kassel (DE)

(72) Inventor: Andreas Pellegrini, Edermünde (DE)

(73) Assignee: BODE—DIE TÜR GMBH, Kassel (DE)

( * ) Notice: Subject to any disclaimer, the term of this patent is extended or adjusted under 35 U.S.C. 154(b) by 70 days.

(21) Appl. No.: 18/447,896

(22) Filed: Aug. 10, 2023

(65) Prior Publication Data

US 2024/0060341 A1 Feb. 22, 2024

(51) Int. Cl.

*E05D 15/06* (2006.01)
*B60J 5/06* (2006.01)
*B61D 19/00* (2006.01)

(52) U.S. Cl.

CPC ............. *E05D 15/063* (2013.01); *B60J 5/062* (2013.01); *B61D 19/005* (2013.01); *E05Y 2201/64* (2013.01); *E05Y 2201/684* (2013.01); *E05Y 2800/269* (2024.05); *E05Y 2800/674* (2013.01); *E05Y 2800/676* (2013.01); *E05Y 2800/682* (2013.01); *E05Y 2900/506* (2013.01); *E05Y 2900/51* (2013.01); *E05Y 2900/531* (2013.01)

(58) Field of Classification Search

CPC ...... E05D 15/063; B60J 5/062; B61D 19/005; D05Y 2201/64; D05Y 2201/684; D05Y 2900/506; D05Y 2900/51; D05Y 2900/531

See application file for complete search history.

(56) References Cited

U.S. PATENT DOCUMENTS 4,073,034 A * 2/1978 Martens ................ E05D 15/063 16/87 R
4,112,539 A * 9/1978 Hagen ................... F16C 29/005 16/88
5,970,578 A * 10/1999 Mensching ............. A63J 1/028 16/106
6,945,364 B1 * 9/2005 Wesson ................... B66B 13/30 187/334

(Continued)

FOREIGN PATENT DOCUMENTS

DE 202020105924 U1 * 1/2022 ......... E05D 15/0643
EP 1013864 A1 6/2000

(Continued)

*Primary Examiner* — Jason W San
*Assistant Examiner* — Matthew J Sullivan
(74) *Attorney, Agent, or Firm* — CANTOR COLBURN LLP

(57) ABSTRACT

A pivot sliding door guiding device includes a longitudinal profile with a guiding track and slider, supported on support rollers in a linearly movable manner in the guiding track, and which is connected to a door leaf and transfers a bearing load onto the slider. In the guiding track, convex bearing members extending in the longitudinal direction are disposed, on which support rollers of the slider with, in each case, peripherally extending concave guiding grooves roll and are retained in the transverse direction. The door leaf is connected to the slider whereby a center of gravity acts off-center on the slider in running and transverse directions. The slider has support rollers which serve for the load transfer of the load acting from the door leaf on the slider. The rollers roll on upper and lower convex bearing members, and transfer load of the door leaf via the convex bearing members.

17 Claims, 7 Drawing Sheets

(56) References Cited

U.S. PATENT DOCUMENTS

| | | | | |
|---|---|---|---|---|
| 11,466,495 | B2 * | 10/2022 | Veilleux | E05D 15/063 |
| 11,478,088 | B2 * | 10/2022 | Goppion | E05D 15/06 |
| 11,492,831 | B2 * | 11/2022 | Kao | E05D 15/0634 |
| 11,879,283 | B2 * | 1/2024 | Duer | E05D 15/063 |
| 12,037,839 | B2 * | 7/2024 | Oakes | E06B 3/4636 |
| 2009/0000204 | A1 * | 1/2009 | Chang | E05D 15/0634 49/425 |
| 2011/0209306 | A1 * | 9/2011 | Pritz | E05D 15/0652 16/91 |
| 2023/0069116 | A1 * | 3/2023 | Bailey | B61B 1/02 |
| 2023/0392424 | A1 * | 12/2023 | Pellegrini | B60J 5/062 |

FOREIGN PATENT DOCUMENTS

| | | | |
|---|---|---|---|
| EP | 1040979 | A2 | 10/2000 |
| EP | 1314626 | A1 | 5/2003 |
| WO | 2008149632 | A1 | 12/2008 |
| WO | 2010049172 | A1 | 5/2010 |
| WO | 2022078964 | A1 | 4/2022 |

* cited by examiner

PIVOT SLIDING DOOR GUIDING DEVICE WITHOUT GUIDE RAIL

CROSS-REFERENCE TO RELATED APPLICATIONS

This application claims the benefit of German patent application 10 2022 120 816.8, filed on 17 Aug. 2022, the disclosure of which is incorporated herein by reference in its entirety.

TECHNICAL FIELD

The present disclosure relates to a pivot sliding door guiding device of a public transport vehicle, comprising

- a longitudinal profile formed from a first material for attachment to a door portal, which forms a guiding track, which is U-shaped in cross section, with a bottom surface and two side walls extending therefrom,
- a slider, which at least partially reaches directly into the guiding track and is supported on support rollers in a linearly movable manner in the guiding track, with an attachment region for an attachment of a door leaf, wherein a bearing load is transferred via the attachment region onto the slider.

BACKGROUND

A public transport "vehicle" may be understood to denote wheeled or railbound vehicles. A wheeled vehicle may be, for example, a bus or other transport vehicle intended for passenger transport. For example, a railbound vehicle may be a train (e.g. a high-speed train or a commuter train), a streetcar, a tram, an urban-suburban commuter railway train (S-Bahn), an underground train etc.

In addition to a pivoting movement, pivot sliding doors also carry out a lateral displacement during the opening and closing process. Such door systems are known, for example, from EP 1 040 979 A2 and EP 1 314 626 A1.

SUMMARY

The disclosure relates to passenger doors with one or two leaves; accordingly, the terms and descriptive passages used in the present case, which relate to "one" door leaf, do not exclude the possibility of using the disclosure also in passenger doors with two or more leaves. A "door leaf" may also be understood to be synonymous with a "door panel" or a door.

Guiding devices for door systems are generally known from the prior art. A longitudinal profile, to which a guide rail is attached via slot nuts and/or screws, for instance, to a bend- and torsion-resistant carrier profile, is usually provided on the vehicle. A slider connected to the door leaf is guided in a linearly movable manner in the guide rail.

In the case of pivot sliding doors, high loads result from the fact that the load or center of gravity of the door leaf connected to the slider does not act centrally on the slider, but rather in an offset manner both in the linear running direction (X-direction) and in the transverse direction (Y-direction) extending transversely thereto. Generally, the door leaf is attached to one of the free ends of the slider, whereby the latter is pulled downwards on one side. This results in a high level of wear of the rolling members and the guide rail. Additionally, the door leaf is moved in the transverse direction (Y-direction) during the movement and also due to lateral forces exerted, for instance, by passengers. This also results in high loads in the guide rail, and to the door wobbling or vibrating in an unwanted manner.

Also, the manufacture of such a guide rail, which is attached to the carrier profile, is relatively expensive because, in order to be able to absorb the loads, it is made from steel in a drawing process, is then hardened, straightened and provided with surface protection. A drawback of a guiding device configured in this manner—particularly if used in a passenger door of a public transport vehicle—is also the relatively large own weight, which results from the massive design, and the relatively large construction space requirement.

Accordingly, the present disclosure is based on providing a guiding device for a pivot sliding door system of a vehicle which can be manufactured with as little effort as possible and at low costs. In this case, the own weight and need for construction space are supposed to be as small as possible. It is also essential that the guiding device can be operated in a permanently reliable manner with as little wear as possible.

A guiding device with the features of the independent claim is proposed in order to achieve the advantage.

It must be noted that the features cited individually in the claims can be combined with each other in any technologically meaningful manner and represent other embodiments of the disclosure. The description, in particular in connection with the Figures, additionally characterizes and specifies the disclosure.

The pivot sliding door guiding device according to the disclosure is particularly advantageous because

- a convex bearing member extending in the longitudinal direction is in each case arranged in the guiding track on the inner faces of the side walls, namely an upper convex bearing member and a lower convex bearing member, wherein the bearing members are arranged such that they extend parallel to each other and are opposite each other,
- the support rollers supporting the slider each have a peripherally extending concave guiding groove, by means of which they roll in each case on one of the convex bearing members and are retained in the transverse direction in operation during a linear movement of the slider in the running direction,
- the longitudinal profile is formed from a first material which is softer than a second material from which the bearing members are formed,
- the attachment region for the door leaf is arranged on the slider such that the center of gravity of the former, or the center of gravity of a door leaf attached thereto, acts off-center on the slider in the running direction and in the transverse direction,
- the slider exclusively has support rollers which, together, serve for the load transfer of the load acting from the door leaf on the slider,
- in operation, at least one support roller rolls on the upper convex bearing member and at least one other support roller rolls on the lower convex bearing member, wherein both support rollers transfer load of the door leaf via the convex bearing members.

In the sense of the disclosure, the term support roller is used synonymously with all suitable bodies that may roll on convex bearing members, in particular balls, rollers or wheels.

An essential aspect of the disclosure lies in the fact that a guide rail, which is always provided in the prior art of pivot sliding doors, is completely dispensed with. The slider is directly guided in the longitudinal profile firmly connected to the vehicle. By dispensing with the guide rail, considerable savings in costs as well as weight are possible. The effort for installation and maintenance of the guiding device is also considerably reduced. Accordingly, the longitudinal profile is correspondingly adapted with regard to its geometry, so that it permits the accommodation and movement of the slider. For this purpose, it forms a guiding track, which is U-shaped in cross section, with a bottom surface and two side walls preferably extending approximately at right angles therefrom.

Further, the applicants have found that it is not necessary to manufacture the entire longitudinal profile, which usually consists of less durable aluminum, from a sufficiently hard and durable material; rather, it is sufficient to provide suitable bearing members in the longitudinal profile, on which the slider can be permanently guided with low wear. Therefore, the bearing members are made from a harder material than the longitudinal profile itself. For example, the longitudinal profile is manufactured from aluminum, but the bearing members from steel, preferably from hardened and surface-treated steel.

Preferably, the bearing members may be formed by round bars that are attached to or in the inner faces of the U-shaped longitudinal profile, so that the support rollers contact the round bars and roll thereon when the slider moves. The round bars are embedded into the longitudinal profile, e.g. in corresponding longitudinal grooves extending along a longitudinal axis of the longitudinal profile or the guiding track in the direction of movement of the slider. Viewed in cross section, only a portion of the round bars protrudes from an inner surface of the guiding track. Preferably, more than 50% of the embedded bearing members are located within the side walls of the guiding track.

The disclosure is explained below in connection with round bars, wherein they are to be understood only as examples, and the disclosure is not supposed to be limited to round bars. A particular advantage when using round bars lies in that fact that they can be manufactured particularly easily and inexpensively, and that the surface treatment is also possible with relative ease.

According to the disclosure, the support rollers supporting the slider in the longitudinal profile each have a peripherally extending concave guiding groove, by means of which they roll in each case on one of the round bars in operation during a linear movement of the slider in the running direction. Advantageously, the support rollers, and thus also the slider and the door leaf, are retained in the transverse direction in this manner. Particularly in the case of pivot sliding doors, this is a very substantial advantage of the disclosure because movements of the door leaves in the transverse direction can hardly be avoided during the movement of the door, but also in the opened state of the door leaf. The are produced by the complex sequence of movements of the door leaf, but also by persons, for instance, who inadvertently push against the door leaves from the outside. The use of convex surfaces of the bearing members and correspondingly adapted support rollers with concave furrows effectively counteracts this problem.

Another essential aspect of the disclosure lies in the fact that the slider has no tension or guide rollers, but only support rollers. In contrast to the prior art, all support rollers arranged on the slider are thus involved in the load transfer by the gravity of the door acting on the slider. Preferably, all support rollers therefore have the exact same geometry. This is advantageous particularly if the two bearing members, i.e. the upper and the lower bearing members, also have the same geometric dimensions. In this case, it is not necessary to manufacture different support rollers, which have to be correctly positioned and arranged during installation.

The door leaf is generally arranged in the region of the free end of the slider or attached there to the attachment region of the slider. This is also the cause for the off-center load on the slider.

According to the disclosure, in operation, at least one support roller rolls on the upper convex bearing member and one other support roller rolls on the lower convex bearing member, wherein all support rollers transfer the load of the door leaf together.

Preferably, more than two support rollers are provided. In a particularly advantageous embodiment, two support roller groups are provided, whose support rollers are disposed in each case side-by-side in the running direction of the slider, wherein the first support roller group is arranged closer to the door leaf than the second support roller group.

An ideal load distribution and smoothness of the movement of the door leaf results if a group spacing between the two support roller groups is greater than a roller spacing between the individual support rollers. In a particularly preferable embodiment, this optimal arrangement is additionally improved upon if the first support roller group has more support rollers than the second support roller group. This is advantageous particularly because the load is introduced by the door leaf at the end side of the slider. If, at first, several support rollers are provided close to the point of introduction of the load, this results in an optimal load distribution in the slider, and thus in a more uniform load on the support rollers. Preferably, the support roller spacing between individual support rollers of the first support roller group should be smaller than the support roller spacing of the second support roller group.

An arrangement of a first support roller group with five support rollers and a second support roller group with two support rollers has proved to be very advantageous.

At least one of the support rollers is preferably configured to be adjustable and fixable with regard to its height such that the support rollers, during installation, can be braced against each other in the guiding track, and can be guided in a clearance-free manner in operation. For example, the adjustable support rollers may have an eccentric adjustment means via which the height is adjustable. Preferably, it may be provided that either the support rollers that are supposed to abut against the upper bearing member, or the support rollers that are supposed to abut against the lower bearing member, are configured to be height-adjustable. In principle, however, also all the support rollers may be configured to be height-adjustable. In this embodiment, the guiding track has a height exceeding the diameter of the support rollers.

It has proved to be particularly advantageous if the installed support rollers are positioned such that they alternately contact the upper and the lower bearing members.

In a particularly advantageous embodiment, the two adjacent support rollers of the two support roller groups, i.e. the support rollers delimiting the group spacing between the two support roller groups, either both contact the upper or both contact the lower bearing member.

The disclosure not only relates to the use of aluminum for manufacturing the longitudinal carrier and hardened steel for manufacturing the bearing members; alternatively, other suitable materials may also be used. In particular, it is also possible to manufacture the support rollers from metal or plastic, with metal having proved to be particularly suitable.

According to another advantageous embodiment, an additional carrier, which is configured for carrying a door leaf and detachably connected to the slider, may be provided in a guiding device proposed by the disclosure. A door leaf may be directly attached to or arranged on such a carrier. The door leaf may also be indirectly attached to the carrier, i.e. by interposing suitable connecting, carrying or guiding means. An "attachment" does not preclude the carrier from also having guiding or bearing properties in addition to "carrying" a load. The fact that the carrier is detachably connected to the slider simplifies the installation of the guiding device prior to commissioning. Also, the carrier is thus more easily replaceable, e.g. in the case of damage or maintenance.

BRIEF DESCRIPTION OF THE DRAWINGS

The disclosure is explained further with reference to the following Figures. They depict an embodiment of the disclosure that is not to be understood to be limiting. In the Figures.

DETAILED DESCRIPTION OF THE DRAWINGS

Figure 1:
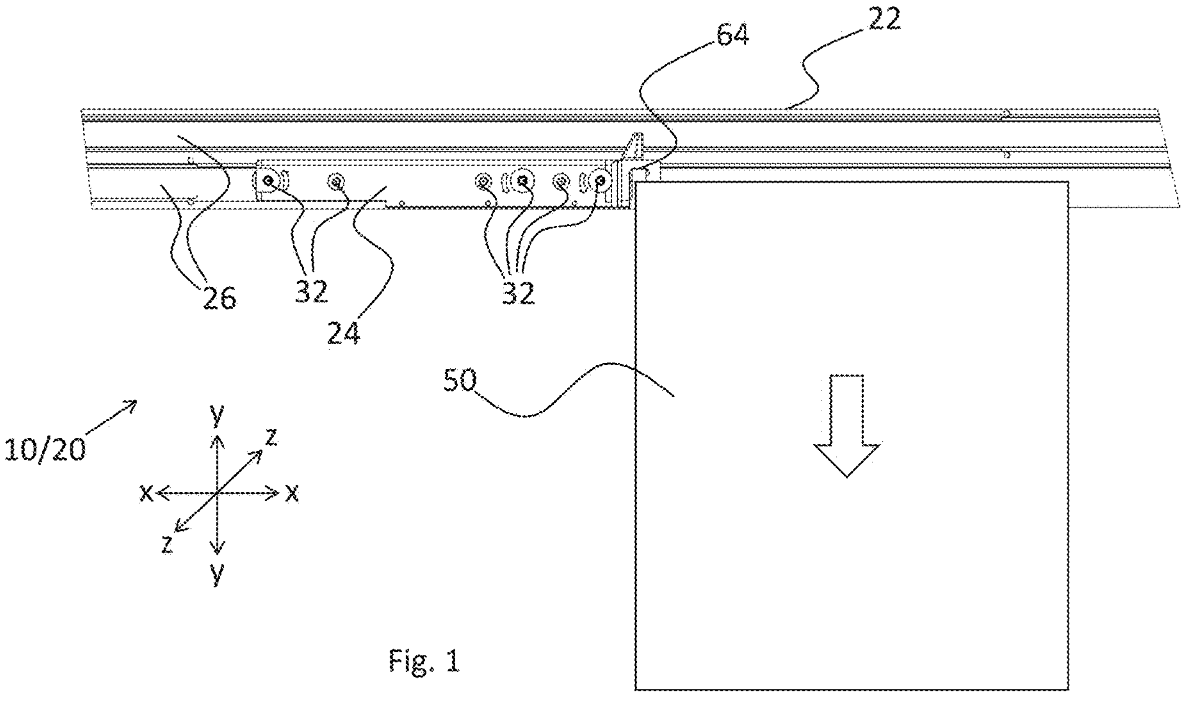
FIG. 1 shows an illustration of a portion of a preferred embodiment of the disclosure in a frontal view with a door leaf and a slider.

Particularly the FIGS. 1 to 4 illustrate the structure of a preferred embodiment of a pivot sliding door guiding device 20 according to the disclosure.

The pivot sliding door guiding device 20 may be used, for example, in a pivot sliding door system 10 of a vehicle (e.g. a public transport vehicle) which is not depicted. The pivot sliding door system 10 comprises at least one door leaf 50 (optionally also several, e.g. two, door leaves 50), which can be moved via a transverse guide 54, using a drive unit, from a position closing a door portal of the vehicle into an open position enabling the entry of passengers through the door portal. Preferably, the pivot sliding door guiding device 20 is arranged in the upper region of the door portal; it may also be retrofitted into door systems already implemented in a vehicle.

Figure 3:
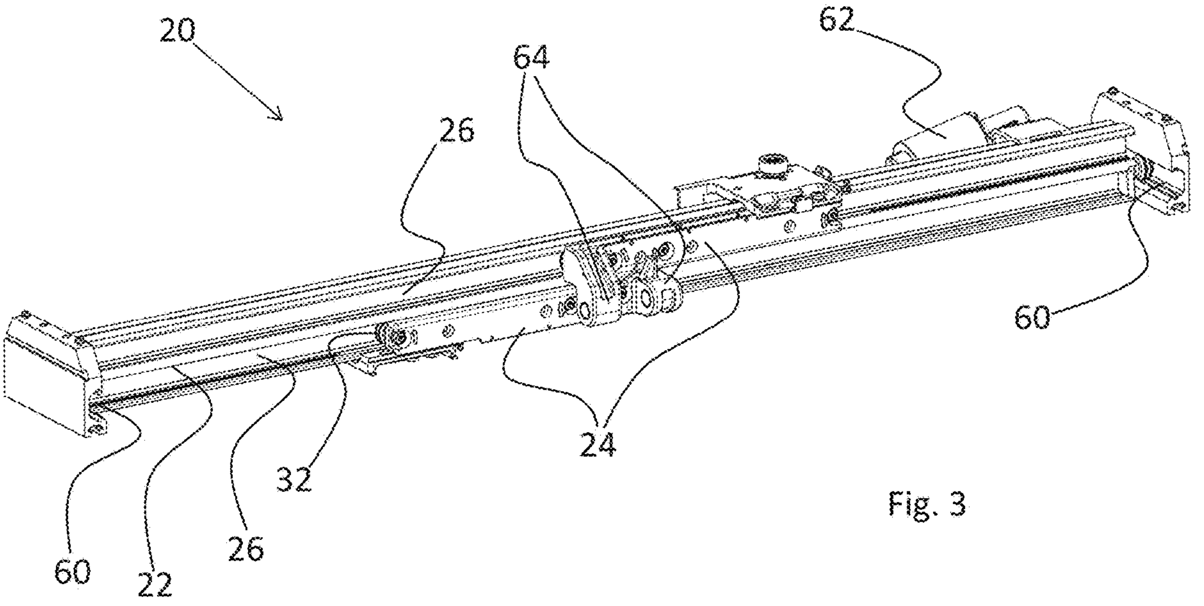
FIG. 3 shows a perspective view of the embodiment from FIG. 1, obliquely from the front, without a door leaf and with two sliders.
Figure 4:
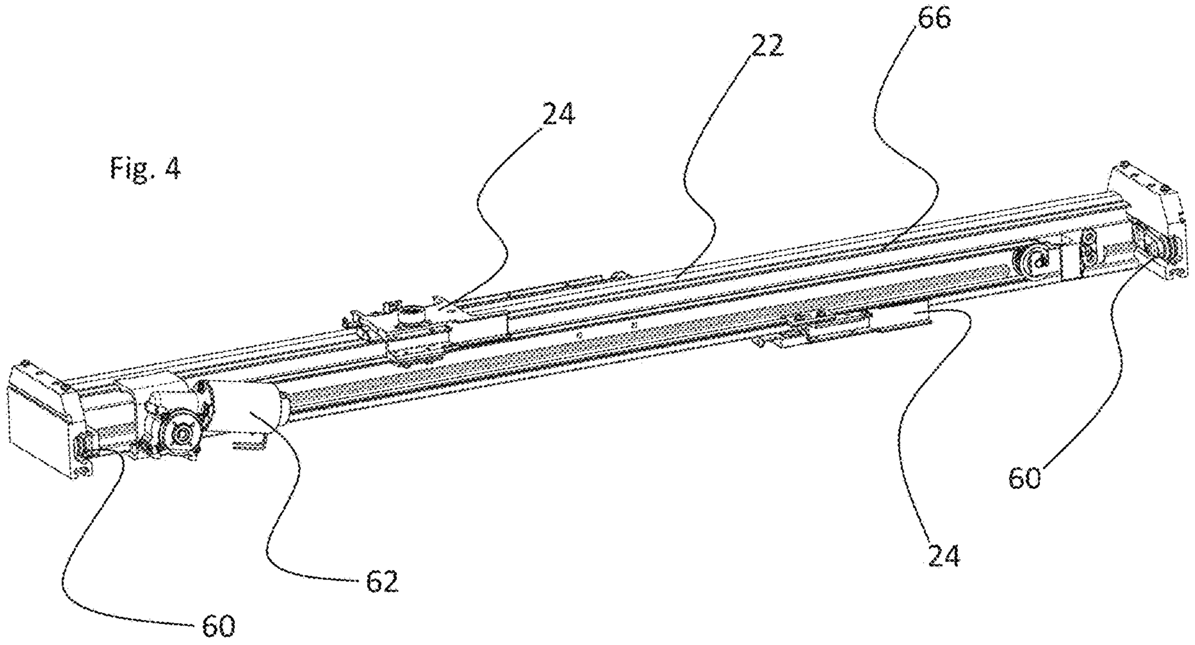
FIG. 4 shows a perspective view of the embodiment from FIG. 1, obliquely from the rear, without a door leaf and with two sliders.

The transverse guide 60 but also the drive units 62 which drive the door leaves 50 in the longitudinal direction can be seen in FIGS. 3 and 4. When the door leaves 50 are opened, the drive units 62 are first moved out of the door portal in order to then move the door leaves 50 laterally of the vehicle, e.g. by means of a spindle or toothed-belt drive with a toothed belt 66 (see FIG. 4).

Figure 2:
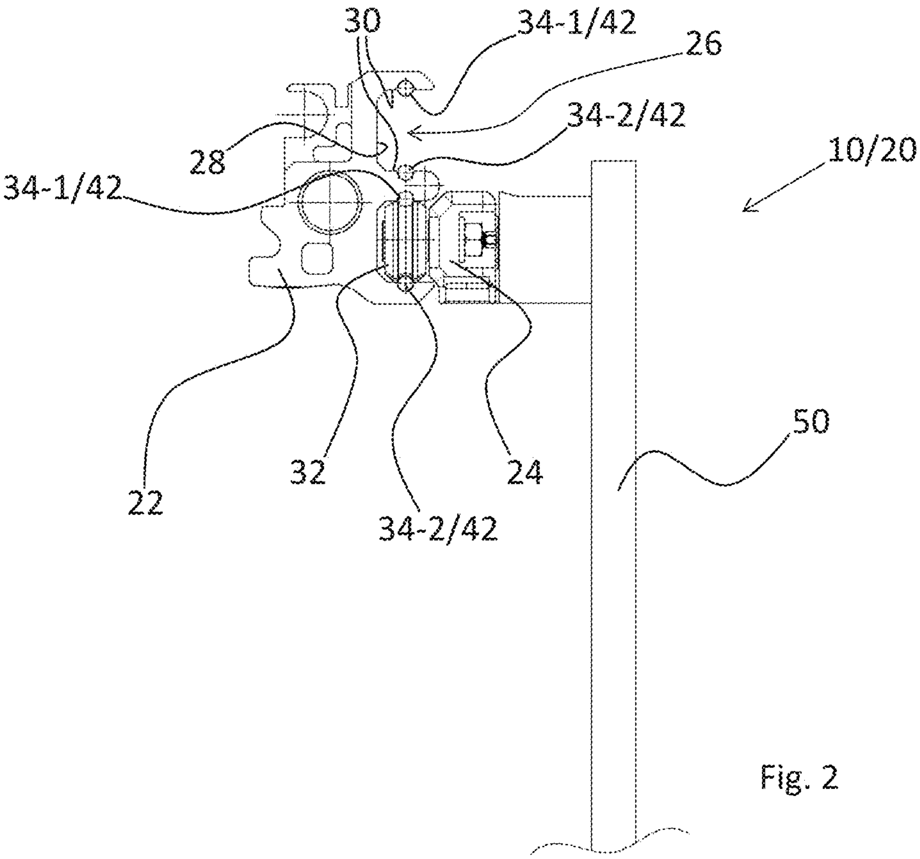
FIG. 2 shows a cross-sectional view of the embodiment from FIG. 1.

A slider 24 guided in a linearly movable manner is disposed in a longitudinal profile 22. The slider 24 reaches at least partially into the longitudinal profile 22, which is configured like a U-shaped profile. Depicted is a longitudinal profile 22 with two guiding tracks 26, wherein a slider 24 is shown in FIGS. 1 and 2 only in the lower guiding track 26 for illustrative reasons; of course, a slider 24 is guided also in the depicted upper guiding track 26. If the pivot sliding door system 10 has only one door leaf 50, a single guiding track 26 is sufficient.

The two guiding tracks 26 each have a bottom surface 28 and two side walls 30 extending therefrom at right angles (see, in particular, FIGS. 5 and 6), wherein the two inner side walls 30 of the two guiding tracks 26 are formed by a common central web in the illustrated exemplary embodiment. Alternatively, two longitudinal profiles 22 that do not have a common central web may also be arranged one above the other.

FIG. 1, in particular, illustrates that the door leaf 50 is connected to the slider 24 in an attachment region 64 at a free end of the former. Thus, the load or the center of gravity of the door leaf 50 (indicated by the arrow in FIG. 1) does not act centrally on the slider 24, but acts, at the end side, off-center in the longitudinal direction X-X. In addition, the center of gravity of the door is arranged off-center also in the transverse direction Y-Y, which is clearly shown in FIG. 2. These two facts result in heightened requirements with regard to the configuration and positioning of the support rollers 32 and the dimensioning of the slider 24.

In the depicted exemplary embodiment, the support rollers 32 of the slider 24 are guided in the guiding track 26 on bearing members 34 extending in the longitudinal direction X-X along the guiding track 26. The bearing members 34 arranged on the inner faces 36 of the side walls 30 each have a convex surface. For this purpose, the support rollers 32 each have a peripherally extending concave guiding groove 52 corresponding thereto, by means of which they roll in each case on one of the convex bearing members 34 and are retained in the transverse direction Y-Y in operation during a linear movement of the slider 24 in the running or longitudinal direction X-X. In the illustrated embodiment, the bearing members 34 are configured as round bars 42 that are each embedded into the side walls 30.

According to the disclosure, the bearing members 34 consist of a harder and more durable material than the longitudinal profile 22.

Figure 5:
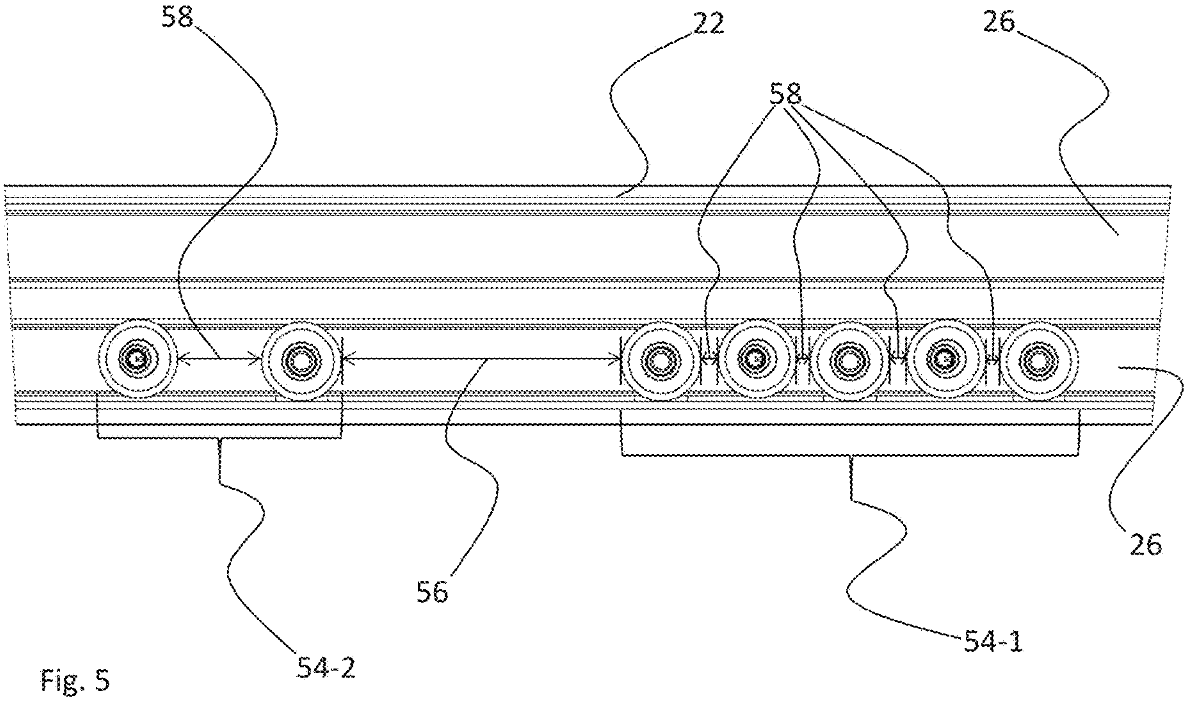
FIG. 5 shows an illustration of support rollers of the preferred embodiment of the disclosure according to FIG. 1 in a frontal view, without a door leaf and without a slider.
Figure 6:
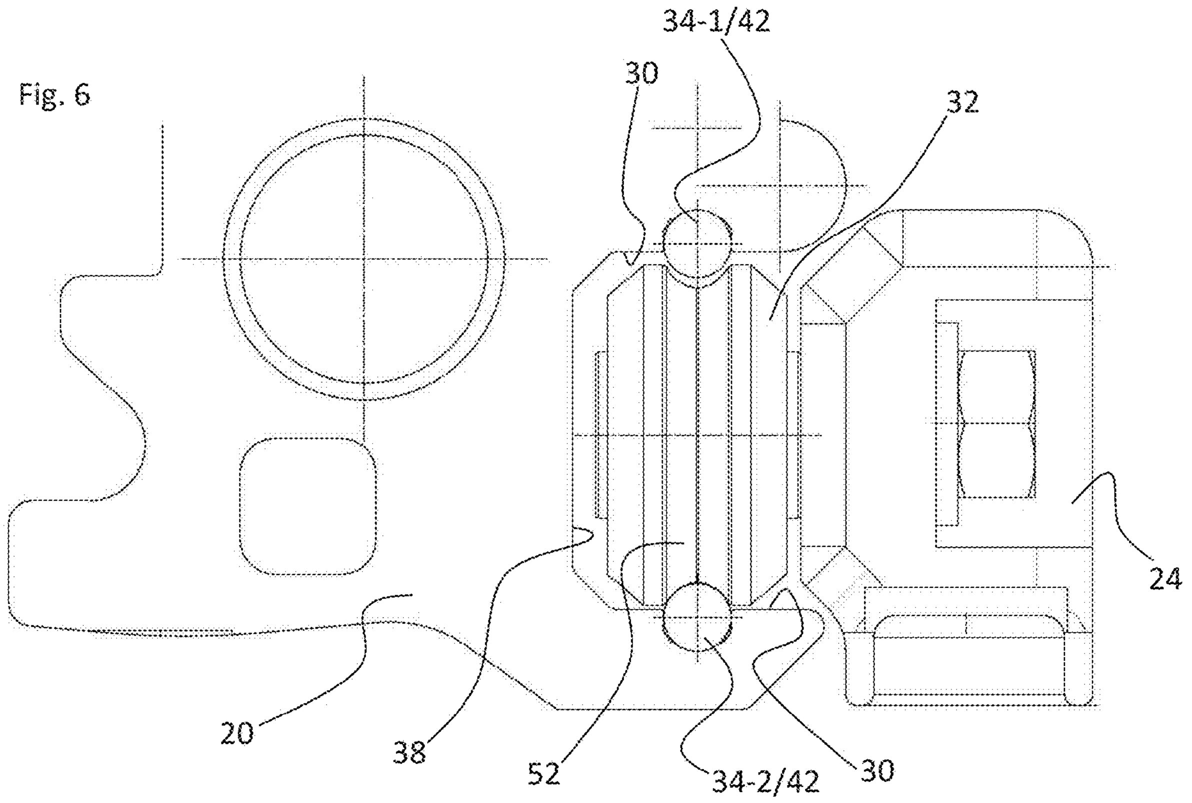
FIG. 6 shows sectional view of the preferred embodiment of the disclosure according to FIG. 1 with a support roller and a slider, support roller abutting against the bottom.
Figure 7:
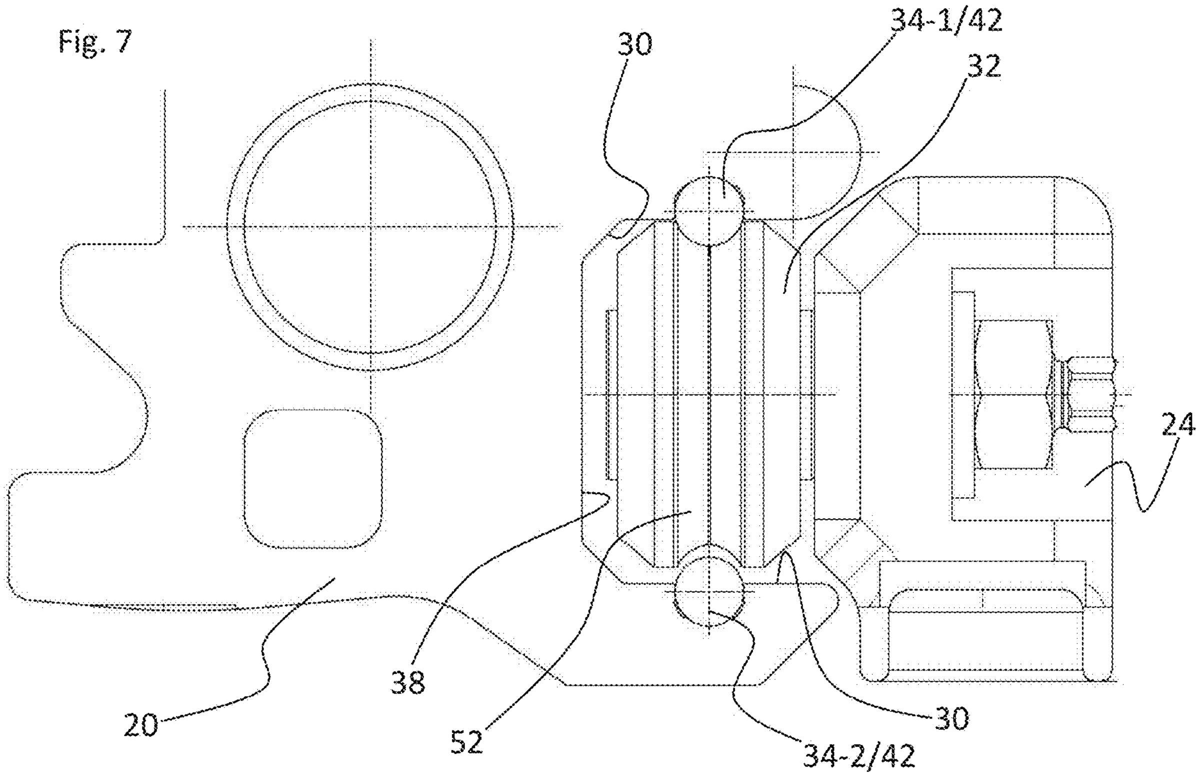
FIG. 7 shows sectional view of the preferred embodiment of the disclosure according to FIG. 1 with a support roller and a slider, support roller abutting against the top.

FIGS. 5 and 6 also illustrate that support rollers 32 roll on the upper convex bearing member 34-1 or on the lower convex bearing member 34-2. With regard to their axis of rotation, the support rollers 32 are arranged at different heights in the guiding track 26; in operation, they are braced against each other. The height of the guiding track 26 exceeds the diameter of the support rollers 32. This is accomplished by at least one of the support rollers 32 being configured in a height-adjustable manner, e.g. by means of an eccentric adjustment means. This adjustability is symbolized in the Figures by the arrows on the slider 24. The support rollers 34 all contribute to a load transfer, irrespective of whether they roll on the upper convex bearing member 34-1 or on the lower convex bearing member 34-2. The two convex bearing members 34, and also all support rollers 32, each have the same geometry, so that each support roller, depending on its positioning, can roll on both bearing members. The arrows shown in FIG. 5 illustrate on which convex bearing member 34 the support rollers 32 roll.

In the depicted exemplary embodiment, it can be seen that two support roller groups 54-1, 54-2 are provided, whose support rollers 32 are disposed in each case side-by-side in the running direction of the slider 24, wherein the first support roller group 54-1 is arranged closer to the door leaf 50 than the second support roller group 54-2. A group spacing 56 between the two support roller groups 54-1, 54-2 is greater than a support roller spacing 58 between individual support rollers 32.

The first support roller group 54-1 has more support rollers 32 than the second support roller group 54-2. It was found that the closeness to the center of gravity of the door leaf 50 has to be taken into account with regard to the number and arrangement of the support rollers 32 in order to obtain an optimum result. It was also found that it is advantageous if the support roller spacing 58 between individual support rollers 32 of the first support roller group 54-1 is smaller than the support roller spacing 58 of the second support roller group 54-2.

In the exemplary embodiment the first support roller group 54-1 has five support rollers 32, and the second support roller group 54-2 has two support rollers 32.

The two adjacent support rollers 32 of the two support roller groups 54, i.e. the support rollers 32 delimiting the group spacing 56 between the two support roller groups 54, contact the same bearing member 34, the lower bearing member 34-2 in the depicted exemplary embodiment.

The disclosure is not limited to the exemplary embodiments shown, but also includes other variants that are possible on the basis of the disclosure.

The invention claimed is:

1. A pivot sliding door guiding device for a public transport vehicle, comprising a longitudinal profile formed from a first material for attachment to a door portal, which forms a guiding track, which is U-shaped in cross section, with a bottom surface and two side walls extending therefrom, a slider, which at least partially reaches directly into the guiding track and is supported on support rollers in a linearly movable manner in the guiding track, with an attachment region for an attachment of a door leaf, wherein a downward load is transferred via the attachment region onto the slider, wherein a convex bearing member extending in the longitudinal direction is in each case arranged in the guiding track on the inner faces of the side walls, namely an upper convex bearing member and a lower convex bearing member, wherein the bearing members are arranged such that they extend parallel to each other and are opposite each other, the support rollers supporting the slider each have a peripherally extending concave guiding groove, by means of which they roll in each case on one of the convex bearing members and are retained in the transverse direction in operation during a linear movement of the slider in the running direction, the longitudinal profile is formed from a first material which is softer than a second material from which the bearing members are formed, the attachment region is arranged on the slider such that the center of gravity of the door leaf acts off-center on the slider in the running direction and in the transverse direction, the slider exclusively has support rollers which, together, serve for the load transfer of the load introduced via the attachment region and acting on the slider, in operation, at least one support roller rolls on the upper convex bearing member and the other support roller rolls on the lower convex bearing member, wherein both support rollers transfer load of the door leaf via the convex bearing members, wherein all the support rollers arranged on the slider are configured to transfer the load by gravity of the door acting on each slider whereby all support rollers have the same geometry.

2. The pivot sliding door guiding device according to claim 1, wherein the attachment region is arranged in the region of a free end of the slider.

3. The pivot sliding door system according to claim 1, wherein more than two support rollers are provided.

4. The pivot sliding door guiding device according to claim 2, wherein two support roller groups are provided, whose support rollers are disposed in each case side-by-side in the running direction of the slider, wherein the first support roller group is arranged closer to the door leaf than the second support roller group.

5. The pivot sliding door guiding device according to claim 4, wherein a group spacing between the two support roller groups is greater than a support roller spacing between individual support rollers.

6. The pivot sliding door guiding device according to claim 5, wherein the first support roller group has more support rollers than the second support roller group.

7. The pivot sliding door guiding device according to claim 5, wherein the support roller spacing between individual support rollers of the first support roller group is smaller than the support roller spacing of the second support roller group.

8. The pivot sliding door guiding device according to claim 4, wherein the first support roller group has five support rollers, and the second support roller group two support rollers.

9. The pivot sliding door guiding device according to claim 1, wherein at least one support roller is configured to be adjustable and fixable with regard to its height such that the support rollers can be braced against each other in the guiding track and are guided in a clearance-free manner in operation.

10. The pivot sliding door guiding device according to claim 9, wherein adjacent support rollers alternately contact the upper bearing member and the lower bearing member.

11. The pivot sliding door guiding device according to claim 4, wherein the two adjacent support rollers of the two support roller groups, i.e. the supporting rollers that define the group distance between the two support roller groups, contact the same bearing member.

12. The pivot sliding door guiding device according to claim 1, wherein all support rollers and the two convex bearing members each have the same geometry, so that each support roller, depending on its positioning, can roll on both bearing members.

13. The pivot sliding door guiding device according to claim 1, wherein the bearing members are configured as round bars.

14. A pivot sliding door system, comprising a pivot sliding door guiding device according to claim 1.

15. The pivot sliding door guiding device according to claim 1, further comprising two support roller groups, each having support rollers disposed in each case side-by-side in the running direction of the slider, wherein the first support roller group is arranged closer to the door leaf than the second support roller group.

16. The pivot sliding door guiding device according to claim 15, wherein a group spacing between the two support roller groups is greater than a support roller spacing between the plurality of support rollers.

17. The pivot sliding door guiding device according to claim 16, wherein the first support roller group includes more support rollers than the second support roller group.

* * * * *